(12) United States Patent
Sarangapani et al.

(10) Patent No.: US 6,240,343 B1
(45) Date of Patent: May 29, 2001

(54) APPARATUS AND METHOD FOR DIAGNOSING AN ENGINE USING COMPUTER BASED MODELS IN COMBINATION WITH A NEURAL NETWORK

(75) Inventors: Jagannathan Sarangapani, Peoria; David R. Schricker, Dunlap, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/221,924

(22) Filed: Dec. 28, 1998

(51) Int. Cl.$^7$ .................................................. G01M 15/00
(52) U.S. Cl. ........................... 701/29; 73/117.3; 701/101
(58) Field of Search .................................. 73/116, 117.2, 73/117.3, 118.1; 701/29, 31, 34, 101, 102, 110, 111

(56) References Cited

U.S. PATENT DOCUMENTS

| | | | |
|---|---|---|---|
| 5,093,792 | * | 3/1992 | Taki et al. ........................ 364/431.01 |
| 5,361,213 | * | 11/1994 | Fujieda et al. ........................ 701/111 |
| 5,377,112 | | 12/1994 | Brown, Jr. et al. ............... 364/431.12 |
| 5,539,638 | * | 7/1996 | Keeler et al. ..................... 364/424.03 |
| 5,566,092 | | 10/1996 | Wang et al. ...................... 364/551.02 |
| 5,566,273 | | 10/1996 | Huang et al. ........................... 395/23 |
| 5,596,513 | | 1/1997 | Schricker ............................... 364/557 |
| 5,602,761 | | 2/1997 | Spoerre et al. ....................... 364/554 |
| 5,646,341 | | 7/1997 | Schricker et al. ................... 73/117.3 |
| 5,682,317 | * | 10/1997 | Keeler et al. .......................... 701/101 |
| 5,690,072 | * | 11/1997 | Meyer et al. .......................... 123/436 |
| 5,787,378 | | 7/1998 | Schricker ............................... 701/50 |
| 5,821,411 | * | 10/1998 | Lohmann et al. ....................... 73/116 |
| 5,821,412 | | 10/1998 | Bryant et al. ........................ 73/117.3 |
| 5,915,368 | * | 6/1999 | Ishida et al. ........................... 123/675 |
| 6,032,139 | * | 2/2000 | Yamaguchi et al. ................... 706/13 |
| 6,073,262 | * | 6/2000 | Larkin et al. .......................... 714/736 |
| 6,092,017 | * | 7/2000 | Ishida et al. ............................ 701/106 |
| 6,098,012 | * | 8/2000 | Stander et al. ......................... 701/104 |

* cited by examiner

Primary Examiner—George Dombroske
(74) Attorney, Agent, or Firm—Haverstock, Garrett & Roberts; Steven G. Kibby

(57) ABSTRACT

An apparatus and method for diagnosing an engine using computer based models in combination with a neural network which reduces the neural network training and updating required is disclosed. The method and apparatus determine modeled values for a plurality of engine parameters as a function of sensed values in a plurality of initial values; sense a plurality of actual values for the engine parameters; and determine a difference between the actual values and the modeled values for the respective engine parameters. The differences are inputted into a neural network which generates an output pattern as a function of the differences and a plurality of weight values. The weight values and the initial values are then updated as a function of a comparison between the output patterns and a desired pattern, and the engine is responsively diagnosed as a function of the output pattern.

13 Claims, 4 Drawing Sheets

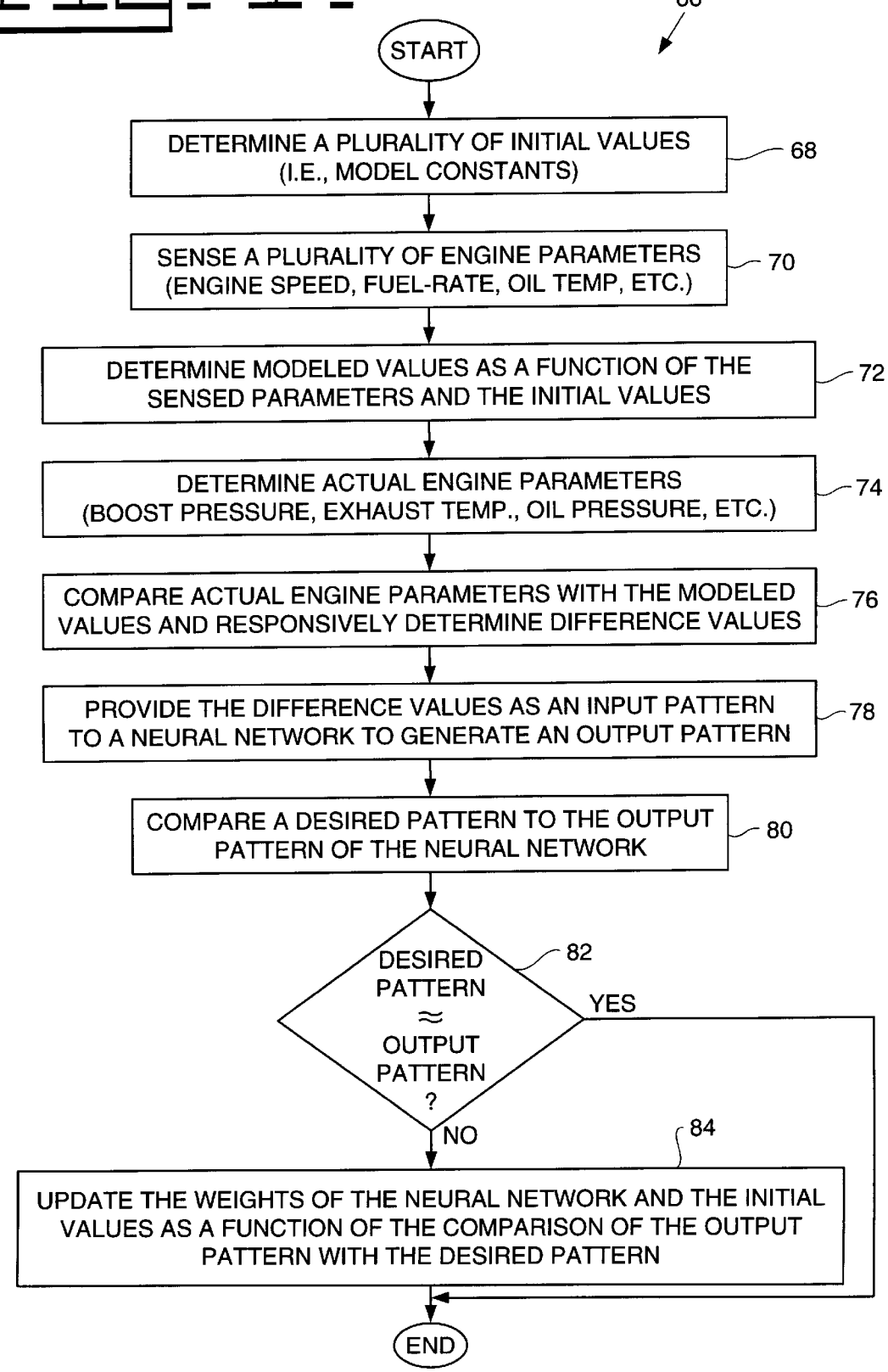

APPARATUS AND METHOD FOR DIAGNOSING AN ENGINE USING COMPUTER BASED MODELS IN COMBINATION WITH A NEURAL NETWORK

TECHNICAL FIELD

This invention relates generally to an apparatus and method for providing engine diagnostics, and more particularly, to an apparatus and method for diagnosing one or more engine problems using computer based models in combination with a neural network.

BACKGROUND ART

Currently, a wide variety of techniques and apparatus are used for diagnosing engines, including, but not limited to, rule based expert systems and fuzzy sets. Typically, the known techniques and apparatus operate to classify machine and/or component conditions into a two state situation, i.e., normal or abnormal.

However, it has been recognized that the identification of a machine or component fault is more properly categorized as a pattern recognition problem. Problems with rule based approaches include long execution time required for the system to look for all possible fault candidates then classify them according to likelihood.

Reference for instance, Schricker et al U.S. Pat. No. 5,646,341 issued Jul. 8, 1997, and U.S. Pat. No. 5,787,378 issued Jul. 28, 1998, both to Caterpillar Inc.

It is also known to diagnose an engine by comparing actual engine parameter values with modeled values. Reference, for instance, Brown Jr. et al U.S. Pat. No. 5,377,112 issued Dec. 27, 1994 to Caterpillar Inc. However, using computer based models alone it has been found to be difficult to provide accurate fault diagnosis when multiple fault conditions are present.

Wang et al U.S. Pat. No. 5,566,092 issued Oct. 15, 1996 to Caterpillar Inc. discloses a diagnostic system and method which integrates several different technologies, including neural networks, expert systems, physical models and fuzzy logic to provide on-line, real-time monitoring of machine components for possible failures. However, the disclosed method relies on substantial training and operator updating for accurate diagnosis.

Accordingly, the present invention is directed to overcoming one or more of the problems as set forth above.

DISCLOSURE OF THE INVENTION

An apparatus and method for diagnosing an engine using computer based models in combination with a neural network which reduces the neural network training and updating required is disclosed. The method and apparatus determine modeled values for a plurality of engine parameters as a function of sensed values and a plurality of initial values; sense a plurality of actual values for the engine parameters; and determine a difference between the actual values and the modeled values for the respective engine parameters. The differences are inputted into a neural network which generates an output pattern as a function of the differences and a plurality of weight values. The weight values and the initial values are then updated as a function of a comparison between the output patterns and a desired pattern, and the engine is responsively diagnosed as a function of the output pattern.

BRIEF DESCRIPTION OF THE DRAWINGS

FIG. 4 is a high level flow chart illustrating a method for diagnosing an engine according to the present invention.

BEST MODE FOR CARRYING OUR THE INVENTION

Figure 1:
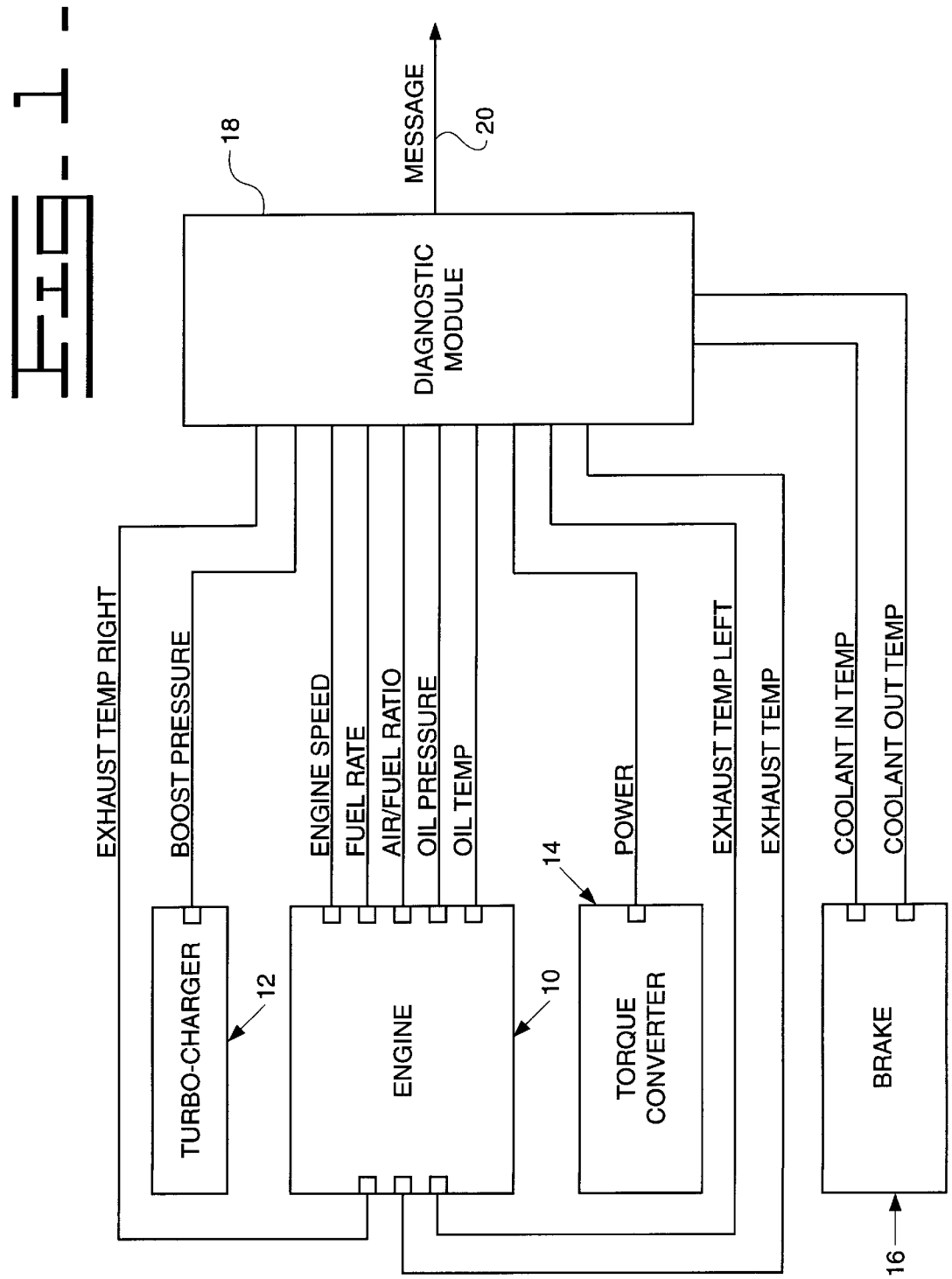
FIG. 1 is a block diagram of an engine and apparatus for diagnosing the engine according to the present invention.

With reference to FIG. 1, the present invention is an apparatus and method for diagnosing an engine 10. Engine 10 is representative of a wide variety of internal combustion engines, including spark ignited engines and compression ignited engines, having an intake system, a coolant system and an exhaust system (not shown) constructed and operable in the conventional manner. Additionally, engine 10 is shown in operative association with a turbocharger 12, a torque converter 14, and a brake 16, all conventionally constructed and operable.

Engine 10 includes a plurality of sensors operable for sensing a variety of operating parameters of the engine, including, but not limited to: engine speed, the rate of fuel delivery to the engine, the ratio of air to fuel delivery to the engine, the pressure of oil in the engine, the temperature of the oil, the temperature of exhaust leaving the engine, and, in the instance of an engine having two banks of cylinders, the temperature of the exhaust from the right bank of cylinders, and the temperature of the exhaust leaving the left bank of cylinders. Turbocharger 12 includes a sensor for sensing boost pressure provided thereby. Torque converter 14 includes a sensor for sensing power at the torque converter 14. Brake 16 includes a sensor for sensing the temperature of coolant entering the brake 16, and a sensor for sensing the temperature of coolant leaving the brake 16.

The present invention includes a diagnostic module 18 operatively connected to the sensor of engine 10, turbocharger 12, torque converter 14, and brake 16 for receiving signals containing information representative of the above referenced sensed parameters, either directly, or indirectly through a device such as an engine control module, a signal filter, a signal processor, or the like. Diagnostic module 18 includes a computer capable of real-time modeling and operation of a neural network using the above discussed signals as inputs and generating a diagnostic message on an output 20 connected in communication with an output device such as a fault signal board or screen located in an operator cab, and/or a memory type device for storing the message for retrieval by service or maintenance personnel.

According to the present invention, diagnostic module 18 is used for diagnosing engine 10 with the following steps. First, a plurality of initial values or model constants are determined for selected engine parameters under predetermined normal engine operating conditions. A plurality of modeled engine parameter values are then determined as a function of selected sensed engine parameters and the initial values. Then, during subsequent operation of engine 10, actual engine parameters are sensed and a difference is determined between the sensed actual engine parameters and the modeled engine values. These differences are then provided as inputs into a neural network to generate an output pattern as a function of the differences and a plurality of weight values. The output pattern is compared with a desired pattern, and the weight values of the neural network and the initial values are updated as a function of the comparison. The engine 10 is then diagnosed as a function of the output pattern.

Figure 2:
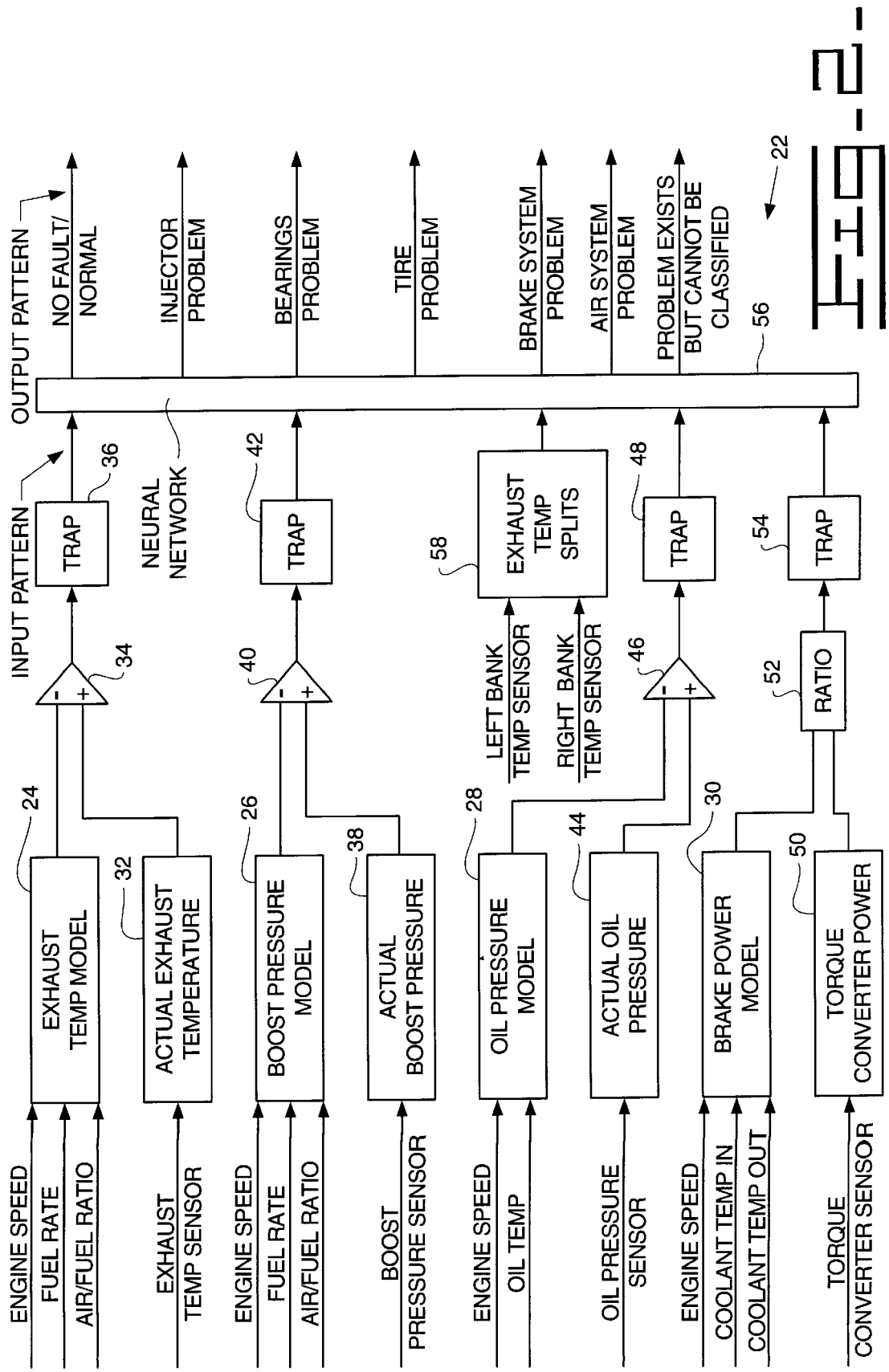
FIG. 2 is a flow diagram illustrating the operation of the present apparatus for diagnosing the engine of FIG. 1.

With reference to FIG. 2, a block diagram 22 for the apparatus and method of the present invention is shown. Preferably, the present invention utilizes four models, including: an exhaust temperature model 24; a boost pressure model 26; an oil pressure model 28; and a brake power model 30. Models 24–30 can be constructed using a wide variety of both sensed and theoretical parameters, as desired. For instance, exhaust temperature model 24 is preferably derived from an engine speed parameter, a fuel rate parameter, and an air/fuel ratio parameter. Boost pressure model 26 is based on the same parameters. Oil pressure model 28 is derived from engine speed and oil temperature. A more thorough discussion of several of the above referenced models 24–28 is provided in Brown, Jr. et al U.S. Pat. No. 5,377,112 assigned to the assignee of the present application. Brake power model 30 is derived from the engine speed parameter, the temperature of coolant entering brake 16, and the temperature of coolant leaving brake 16. A more in depth explanation of model 30 is provided in Schricker U.S. Pat. No. 5,596,513 assigned to the same assignee as the present application. Here, it should be recognized and understood that the present invention is not limited to the combination of models herein discussed and referenced above, and can include any number and combination of other models of engine parameters for which faults are to be diagnosed, without departing from the scope of the invention.

Exhaust temperature model 24 is used to determine a modeled or predicted value of the exhaust temperature of engine 10. At block 32, an actual exhaust temperature is determined from the exhaust temperature sensor of engine 10. The actual value and the modeled value of the exhaust temperature are compared at block 34, and a first difference signal is produced and trapped at block 36. Each parameter includes a trap definition that identifies the conditions under which data will be stored or trapped for trending purposes. Typically, the trap definition is selected to indicate the normal operating conditions of the machine, e.g., when engine speed and boost pressure are above a predetermined level. The trending or trap definition for each parameter may vary and may be a function of several other machine parameters.

Boost pressure model 26 is used to determine a modeled or predicted value of boost pressure based on engine speed, fuel rate, and air/fuel ratio parameters. An actual boost pressure value is determined at block 38 from the boost pressure signal from engine 10. The actual value and the modeled value of the boost pressure are compared at block 40, and a second difference signal is produced and trapped at block 42. The engine speed parameter and oil temperature parameter are used in the oil pressure model 28 to determine a modeled or predicted value of oil pressure. An actual or sensed oil pressure value is received from engine 10 at block 44. These values are compared at block 46 to determine a difference which is produced and trapped at block 48. The engine speed parameter, the temperature coolant into brake 16 and temperature of coolant out of brake 16 are utilized in brake power model 30 to determine a modeled value for brake power. Power at torque converter 14 is sensed as shown at block 50. A ratio between the modeled brake power and sensed power at the torque converter 14 is then determined at block 52, and a value or difference representative thereof is produced and trapped at block 54. The difference values are compiled into an input pattern which is provided to a neural network 56 to generate an output pattern for diagnosing conditions of or relating to engine 10, including, but not limited to, a no-fault or normal condition, and/or problems associated with an injector, bearing, tire, brake, air system, or an unclassifiable problem. Additionally, an exhaust temperature split value, i.e., a difference between the exhaust temperature of the left bank of cylinders and an exhaust temperature of the right bank of cylinders of engine 10, where present may be used as shown at block 58 as an input to neural network 56. Further, the inputs to neural network 56 may be normalized as desired or required, for proper operation of the network.

Figure 3:
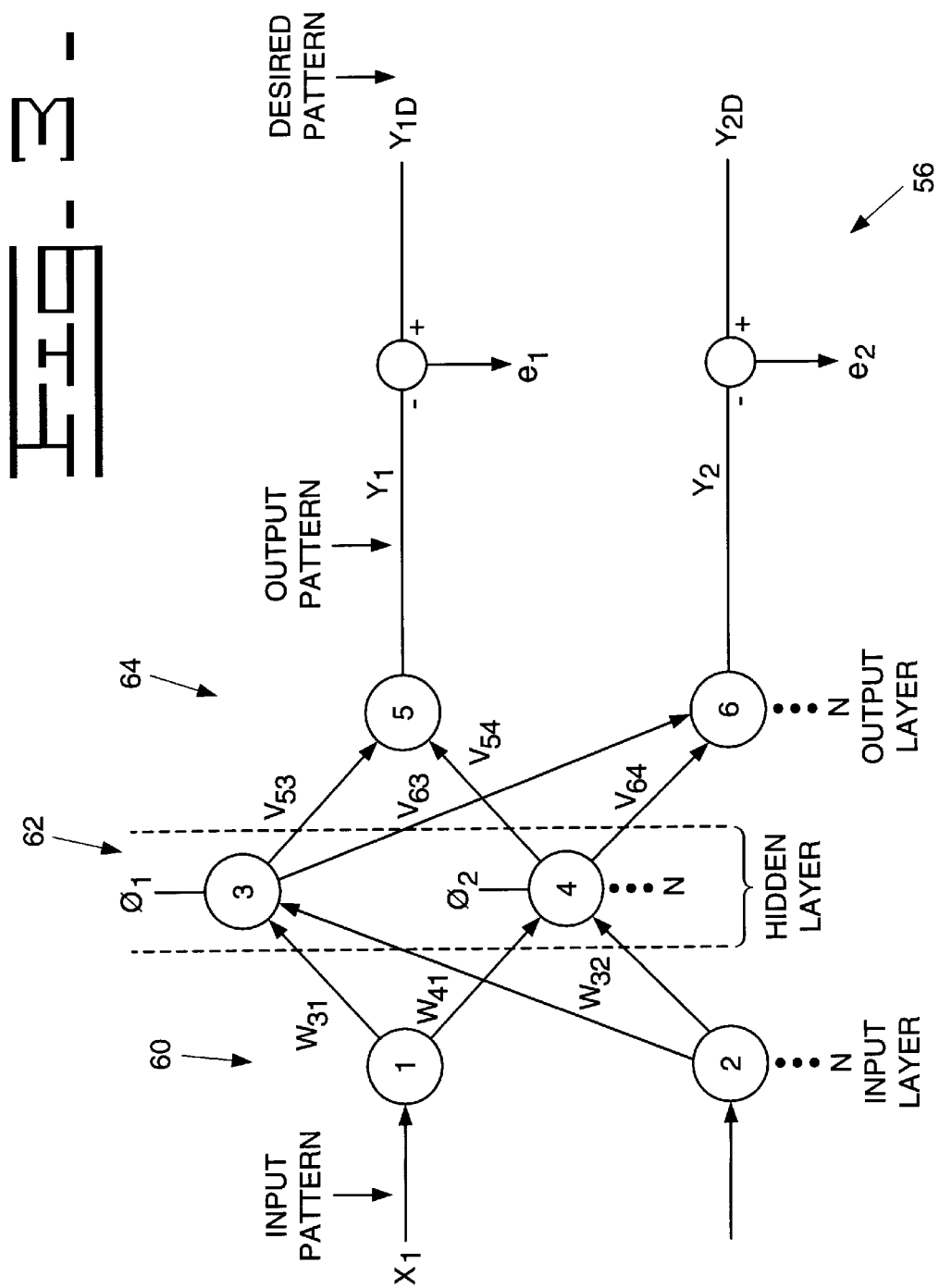
FIG. 3 is a diagrammatic representation of a neural network of the present apparatus.

With reference to FIG. 3, a representative segment of neural network 56 is shown to illustrate operation thereof. Essentially, as is well known in the art, an artificial neural network such as neural network 56 is a simulation of the biological neural network of the human brain. The artificial neural network accepts several inputs, performs a series of operations on the inputs, and produces one or more outputs. Here, neural network 56 consists of three layers; an input layer 60; a hidden layer 62; and an output layer 64. Input layer 60 comprises n number of inputs X representing an input pattern to neural network 56. In the preferred embodiment, the input pattern comprises four inputs $X_1$ through $X_4$ representing the difference values determined respectively from the comparison of the exhaust temperature model and actual exhaust temperature; boost pressure model and actual boost pressure; oil pressure model and actual oil pressure; and brake power model and torque converter power. Additionally, the exhaust temperature split value can be optionally used as a fifth input.

The input layer 60 is connected through weights ($W_{ij}$) to hidden layer 62, the hidden layer in turn being connected to output layer 64 through weighted connections ($V_{ij}$). The number of hidden nodes can be any variable number and may be obtained through trial and error to determine the number of hidden nodes that provides the most optimal results. The output layer 64 comprises n number of outputs Y representing an output pattern of the neural network. Preferably, the output layer consists of seven outputs $Y_1$–$Y_7$ corresponding to the seven specific machine conditions shown in FIG. 2.

Upon start-up, the weights ($W_{ij}$, $V_{ij}$) are initialized to random values, which may be either positive or negative integers or fractions. The input pattern ($X_n$), obtained from the computer-based models, is then presented to the neural network and is processed in accordance with the following equation:

$$Y = V^T \phi(W^T X + \theta)$$

where

Y is the output vector;

$$\begin{bmatrix} Y_1 \\ Y_2 \\ \vdots \\ Y_n \end{bmatrix}$$

$W^T$ is the transpose of the matrix of weights between the hidden layer and the input layer;

$$\begin{bmatrix} W_{31} & W_{41} & \dots \\ W_{32} & W_{42} & \dots \end{bmatrix}$$

$\phi$ is the hidden layer activation function;

θ is the predetermined bias vector;

$$\begin{bmatrix} \theta_1 \\ \theta_2 \\ \vdots \\ \theta_n \end{bmatrix}$$

$V^T$ transpose of the matrix of weights between the output layer and the input layer; and $$\begin{bmatrix} V_{53} & V_{63} & \cdots \\ V_{54} & V_{64} & \cdots \end{bmatrix}$$

X is the input vector.

$$\begin{bmatrix} X_1 \\ X_2 \\ \vdots \\ X_n \end{bmatrix}$$

After processing, the output pattern is compared to a desired pattern, for instance a known fault condition for a given set of inputs, and based upon the comparison, the weights ($W_{ij}$, $V_{ij}$) are updated in accordance with the following equations:

$$W(\text{new}) = w(\text{old}) + F\phi(W^TX+\theta)e^T - F\phi(W^TX+\theta)V^TXe^T$$

$$V(\text{new}) = v(\text{old}) + GX\phi^T[(W^TX+\theta)We]^T$$

where w(new) is the updated matrix of weights between the hidden layer and the input layer;

w(old) is the current matrix of weights between the hidden layer and the input layer;

v(new) is the updated matrix of weights between the output layer and the hidden layer;

v(old) is the current matrix of weights between the output layer and the hidden layer;

$e^T$ is the transpose of the error vector (desired vector-output vector); and $$\begin{bmatrix} e_1 \\ e_2 \\ \vdots \\ e_n \end{bmatrix} = \begin{bmatrix} Y_{1D} - Y_1 \\ Y_{2D} - Y_2 \\ \vdots \\ Y_{nD} - Y_n \end{bmatrix}$$

F and G are appropriate dimensioned matrices representing predetermined learning constants.

FIG. 4 shows a high level flow chart 66 of the present method for diagnosing an engine using neural network 64. Examining flow chart 66, at block 68 the initial values are determined. At block 70 engine and other parameters such as engine speed, fuel rate, oil temperature, oil pressure, brake coolant temperature, turbo-charger boost pressure and the like are sensed. Then, at block 72, the modeled values are determined as a function of the sensed parameters and the initial values.

At block 74, actual engine parameters including engine speed, fuel rate, oil temperature, oil pressure, and the like are determined.

At block 76, the actual engine parameters determined in block 74 are compared with the modeled values determined in block 72 to responsively determine difference values. At block 78 the difference values are inputted as an input pattern to the neural network to generate the output pattern. The output pattern is then compared to a desired pattern, as shown at block 80.

At block 82, if the output pattern equates essentially to the desired pattern, the diagnosis of the engine is responsively produced. If the desired pattern and the output pattern are not essentially equal, the weights of the neural network and the initial values are updated as a function of the comparison of the output pattern with the desired pattern, as shown at block 84, and the engine is diagnosed.

Industrial Applicability

The present apparatus and method for diagnosing an engine using computer based models in combination with a neural network has utility for a wide variety of machine applications wherein real time, on board diagnosis of general operating conditions, multiple fault conditions, and individual fault conditions is desired. An important advantage of the present invention is the capability to provide usable inputs to the neural network as a function of the initial values and sensed parameters, then to update the initial values and network weights based on comparison with the desired pattern, when known, to increase the accuracy of future diagnosis. This has been found to substantially reduce teaching time for the neural network.

Other aspects, objects, and advantages of this invention can be obtained from a study of the drawings, the disclosure, and the appended claims.

What is claimed is:

1. A method for diagnosing an engine, including the steps of:

(a) determining modeled values for a plurality of engine parameters as a function of sensed values and a plurality of initial values;

(b) sensing a plurality of actual values for the engine parameters;

(c) determining a difference between the actual values and the modeled values for the respective engine parameters;

(d) inputting the differences determined in step (c) into a neural network to generate an output pattern as a function of the differences and a plurality of weight values;

(e) updating the weight values and the initial values as a function of a comparison between the output patterns generated in step (d) and a desired pattern; and (f) responsively diagnosing the engine as a function of the output pattern.

2. The method, as set forth in claim 1, where in step (a) the initial values are determined for the engine when running under predetermined normal conditions.

3. The method, as set forth in claim 1, wherein the engine parameters comprise exhaust temperature, oil pressure and power output.

4. The method, as set forth in claim 3, wherein the engine parameters further comprises boost pressure for a turbo-charger of the engine.

5. The method, as set forth in claim 4, wherein the power output is a function of power at a brake and power at a torque converter.

6. The method, as set forth in claim 3, wherein the engine has at least two cylinders, and the engine parameters further comprise a difference between exhaust temperatures for the cylinders.

7. A method for diagnosing an engine, comprising the steps of:

(a) determining a plurality of initial values for a selected plurality of engine parameters under a predetermined normal engine operating condition;

(b) sensing the plurality of engine parameters and determining modeled engine parameter values as a function of the sensed engine parameters and the initial values;

(c) determining actual engine parameters;

(d) comparing the actual engine parameters to the modeled engine parameters and responsively determining corresponding difference values;

(e) providing an input pattern to a neural network to generate an output pattern, the input pattern being a function of the difference values;

(f) updating the neural network and the initial values as a function of a comparison of the output pattern with a desired pattern; and (g) diagnosing an engine problem as a function of the output pattern.

8. The method, as set forth in claim 7, wherein the modeled engine parameter values comprise a modeled value for exhaust temperature determined from a sensed engine speed, a sensed fuel rate, and an air fuel ratio for the engine.

9. The method, as set forth in claim 7, wherein the modeled engine parameter values comprise an exhaust temperature modeled value; an oil pressure modeled value and a power modeled value.

10. Apparatus for diagnosing an engine, comprising:

(a) means for determining a plurality of initial values for a selected plurality of engine parameters under a predetermined normal engine operating condition;

(b) means for sensing the plurality of engine parameters;

(c) means for determining modeled engine parameter values as a function of the sensed engine parameters and the initial values;

(d) means for determining actual engine parameters;

(e) means for comparing the actual engine parameters to the modeled engine parameters and responsively determining corresponding difference values;

(f) means for providing an input pattern to a neural network to generate an output pattern, the input pattern being a function of the difference values;

(g) means for updating the neural network and the initial values as a function of a comparison of the output pattern with a desired pattern; and (h) means for diagnosing an engine problem as a function of the output pattern.

11. Apparatus, as set forth in claim 10, wherein the means for determining actual engine parameters comprise a diagnostic module operatively connected to an engine speed sensor, a fuel rate sensor, at least one exhaust temperature sensor, an oil temperature sensor, and an oil pressure sensor.

12. Apparatus, as set forth in claim 11, wherein the means for determining actual engine parameters further comprise at least one brake temperature sensor, a boost pressure sensor and a torque converter sensor.

13. Apparatus, as set forth in claim 10, wherein the means for determining the modeled engine parameter values, the means for comparing the actual engine parameters to the modeled engine parameters and responsively determining corresponding difference values comprise a diagnostic module.

* * * * *